April 21, 1970  R. F. BRIDGLAND, JR  3,507,521
MONITORS
Filed April 8, 1968
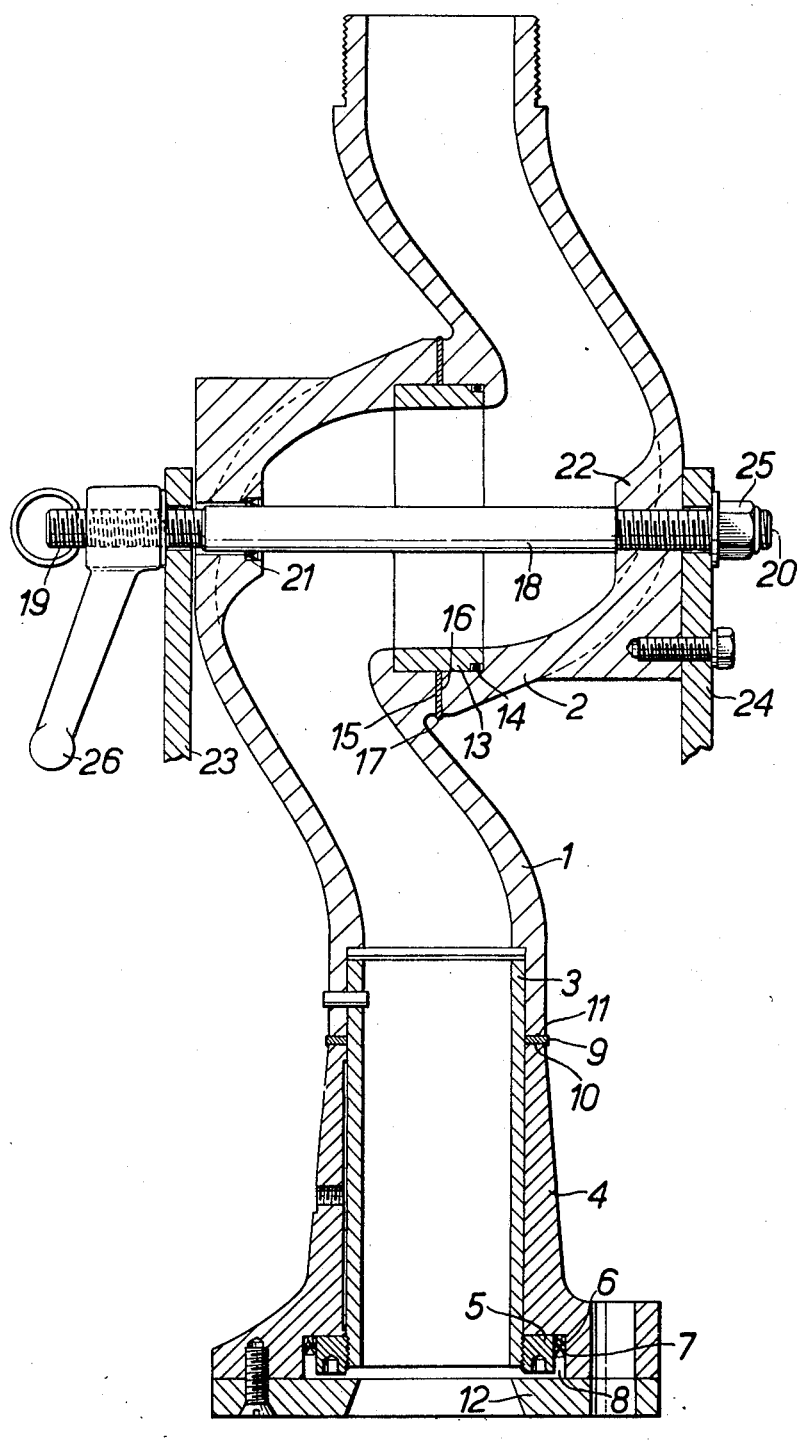

United States Patent Office 3,507,521
Patented Apr. 21, 1970

3,507,521
MONITORS
Robert E. Bridgland, Jr., Old Acre, Midgham,
near Reading, Berkshire, England
Filed Apr. 8, 1968, Ser. No. 719,431
Claims priority, application Great Britain, Aug. 10, 1967,
36,795/67
Int. Cl. F16l 27/00
U.S. Cl. 285—168                                                6 Claims

ABSTRACT OF THE DISCLOSURE

The invention is directed to a monitor for spraying water for firefighting purposes. The monitor comprises a body formed in essentially two parts. One part is mounted for rotation about a substantially vertical axis and the other, nozzle-carrying, part is mounted on the one part for rotation about a substantially horizontal axis.

---

The invention relates to monitors for spraying or discharging water for firefighting purposes.

Monitors are devices mounted on mobile vehicles or other stands, for example static stands, for spraying water for firefighting purposes. A monitor has a discharge nozzle which by means of suitable rotary joints in the body of the monitor, can be swung in a vertical plane and also in a horizontal plane. Conventionally, the movement in a horizontal plane is allowed by a rotary joint at the base of the monitor body, and the movement in a vertical plane is obtained by mounting the nozzle on a bifurcated carrier through the arms of which the water flows to the nozzle, the said arms being pivotally mounted on the monitor body for movement in a vertical plane.

The sealing arrangements necessary at the rotary joints where the bifurcated carrier is mounted on the monitor body are complicated, and the bifurcated construction is expensive due to the complicated shape of the parts.

SUMMARY

In accordance with this invention, there is provided a monitor which includes a body formed primarily in two parts, one of the parts being adapted to carry a nozzle and the other of the parts being mounted for rotation about a substantially vertical axis, the two parts being secured together for relative movement about a substantially horizontal axis, the parts being hollow and providing a through-flow passage for water from the lower end of the other part to the nozzle end of the one part. Each of the rotational connections is provided with a bearing sleeve which both effects the mounting of the respective component for rotation and provides for the flow of fluid through the monitor.

One of the primary objects of this invention is to provide a monitor having improved characteristics for the flow of water therethrough.

Another object of this invention is to provide in a monitor a pivotal connection which includes a bearing sleeve connecting together the two respective pivoting members and the bearing sleeve having an internal surface which conforms to the internal surface of the monitor so as to provide an efficient passage therethrough.

A further object of this invention is to provide in a monitor two parts mounted for rotation relative to one another, the parts being secured together by a through bolt and the bolt also serving to mount a handle on one of the parts to facilitate the pivoting thereof relative to the other part.

These and other objects and advantages of the invention will be clear from the following description taken with reference to the accompanying drawing which is given by way of example and which is a sectional view of the monitor of the invention.

The monitor has a body which comprises two parts 1 and 2. The part 1 has a tubular member 3 fixed thereto, the member 3 extending into a mounting support 4. A ring 5 is fixed to the lower end of the tubular member 3 before it is inserted from underneath into the mounting support 4, and a sealing ring 6 is provided between the ring 5 and the wall 7 of a recess 8 in the mounting support. A thrust supporting member 9 is provided between a face 10 on the mounting support 4 and a face 11 on the part 1 of the monitor body.

The mounting support 4 is connected to an apertured plate 12 which serves as an inlet for water supplied to the monitor.

The parts 1 and 2 of the monitor are hollow and serve for conducting the water to a nozzle (not shown) provided on the part 2 of the monitor. The parts 1 and 2 are so curved that the axis of the part 2 at its outlet end lies in the same vertical plane as the axis of the part 1 at its inlet end. This alignment of the axes is not essential, but is preferable in order to avoid the monitor being subjected to a turning moment as a result of discharge of water from the nozzle.

The parts 1 and 2 are connected together for rotation of the part 2 relative to the part 1 about a horizontal axis. This connection is effected by a bearing sleeve 13 carried by the part 1 and extending into the part 2, with an O-ring seal 14 for engagement by the part 2. Vertical faces 15 and 16 of the parts 1 and 2 respectively bear against opposite sides of an annular bearing member 17 surrounding the sleeve 13. A horizontal shaft 18 extends through the parts 1 and 2, coincident with the axis of relative rotation thereof. The shaft 18 is disposed principally inside the parts 1 and 2 at their junction region, but its ends 19 and 20 extend to the outside through sealing arrangements 21 and 22 in the parts 1 and 2 respectively. These ends 19 and 20 pass through arms 23 and 24 of a U-shaped handle by which the monitor is operated, the end 20 of the shaft 18 having a nut 25 and the end 19 being fitted with a threaded clamping lever 26. The arm 24 of the handle is bolted to the part 2 of the monitor.

It will be appreciated that movement of the monitor nozzle in a horizontal plane is obtained by movement of the part 1 of the monitor about the vertical pivot axis provided by the engagement of the tubular member 3 in the mounting support 4, and movement of the monitor nozzle in a vertical plane is obtained by movement of the part 2 of the monitor relative to the part 1, after slightly releasing the clamping lever 26.

I claim:
1. A monitor comprising a body formed in essentially two parts one of which is adapted for carrying a nozzle at an outlet end thereof, means mounting the other part for rotation about a substantially vertical axis, means securing said two parts together for relative movement about a substantially horizontal axis, the parts being hollow and being shaped to provide a through-flow passage for water from the lower, inlet, end of the said other part to the outlet end of the said one part, the means securing said two parts for relative rotation including said two parts being internally grooved at opposed ends thereof, a bearing sleeve seated in said grooves and being fixedly secured to a first of said two parts in sealed relation while having a close relative rotating fit with the second of said two parts, and a sealing ring disposed between said bearing sleeve and said second part and forming a seal therebetween while permitting relative rotation therebetween, said bearing sleeve seating flush in said two parts and having an internal surface contour matching the internal surface contours of said two parts to provide for uninterrupted flow between said two parts.

2. A monitor as defined in claim 1 together with an annular thrust bearing member directly surrounding the bearing sleeve approximately medially of the bearing sleeve, and opposed vertical faces of the said two parts bearing against opposite sides of the annular thrust bearing member.

3. A monitor as defined in claim 1, wherein said securing means includes a horizontal shaft extending through the two parts, coincident with the axis of relative rotation thereof together with a generally U-shaped handle by which the monitor is moved, the ends of the shaft extending through arms of the said handle and said handle being fixedly secured to said one of said parts, a stop being disposed on one end of the shaft, and a threaded clamping lever being disposed on the other end of the shaft.

4. A monitor as defined in claim 1 together with a lower mounting support having an internal recess at the lower end of said other part, an elongated bearing sleeve secured to the lower end of said other part in sealed relation and depending into said mounting support for relative rotation, a retainer on the lower end of said bearing sleeve and positioned within said mounting support internal recess, said retainer being in horizontal abutting engagement with said mounting support to restrain said other part against relative vertical movement.

5. A monitor as defined in claim 4 together with an annular thrust bearing member directly surrounding said bearing sleeve and being disposed between opposed ends of said other part and said mounting support.

6. A monitor as defined in clam 4 together with a seal within said mounting support internal recess and forming a seal between said retainer and said mounting support.

References Cited

UNITED STATES PATENTS

| | | | |
|---|---|---|---|
| 359,394 | 3/1887 | Jones et al. | 285—185 X |
| 694,321 | 2/1902 | Moran | 285—168 |
| 918,542 | 4/1909 | Hart | 285—281 |
| 2,073,255 | 3/1937 | Schaetzly | 285—185 X |
| 2,086,515 | 7/1937 | Evans | 285—281 X |
| 2,087,908 | 7/1937 | Greenburg | 285—168 |
| 2,554,514 | 5/1951 | Wright et al. | 285—168 |

FOREIGN PATENTS

| | | |
|---|---|---|
| 13,162 | 6/1909 | Great Britain. |

DAVID J. WILLIAMOWSKY, Primary Examiner

W. L. SHEDD, Assistant Examiner

U.S. Cl. X.R.

285—185, 281